(12) United States Patent
Kozuka

(10) Patent No.: US 9,023,287 B2
(45) Date of Patent: May 5, 2015

(54) PRODUCTION METHOD AND PRODUCTION DEVICE FOR POLYVINYL ALCOHOL RESINS

(75) Inventor: Takahiro Kozuka, Itoigawa (JP)

(73) Assignee: Denki Kagaku Kabushiki Kaisha, Tokyo (JP)

(*) Notice: Subject to any disclaimer, the term of this patent is extended or adjusted under 35 U.S.C. 154(b) by 321 days.

(21) Appl. No.: 13/634,331

(22) PCT Filed: Nov. 12, 2010

(86) PCT No.: PCT/JP2010/070174
§ 371 (c)(1),
(2), (4) Date: Sep. 12, 2012

(87) PCT Pub. No.: WO2011/114575
PCT Pub. Date: Sep. 22, 2011

(65) Prior Publication Data
US 2012/0329950 A1 Dec. 27, 2012

(30) Foreign Application Priority Data
Mar. 18, 2010 (JP) ................................. 2010-062768

(51) Int. Cl.
*B01J 19/18* (2006.01)
*C08F 8/12* (2006.01)

(52) U.S. Cl.
CPC ........................ *C08F 8/12* (2013.01)

(58) Field of Classification Search
CPC ............ C08F 18/04; C08F 8/12; B01D 3/20; B01D 3/22; B01D 3/163; B01J 19/18; B01J 19/0066; B01J 2219/185
USPC ............... 525/62; 261/114.4, 114.5; 422/225, 422/600, 624
See application file for complete search history.

(56) References Cited

U.S. PATENT DOCUMENTS

| 4,338,405 A | 7/1982 | Saxton |
| 2005/0053792 A1 | 3/2005 | Toyoshima et al. |
| 2007/0100080 A1 | 5/2007 | Yun et al. |

FOREIGN PATENT DOCUMENTS

| CA | 847445 A | * | 7/1970 |
| JP | 48-099290 | | 12/1973 |
| JP | 48-099752 | | 12/1973 |
| JP | 57-121006 | | 7/1982 |
| JP | 2000-355611 | | 12/2000 |
| JP | 2001-055414 | | 2/2001 |
| JP | 2008-510880 | | 4/2008 |
| WO | 03033548 | | 4/2003 |

OTHER PUBLICATIONS

International Search Report of PCT/JP2010/070174 dated Dec. 14, 2010.

* cited by examiner

*Primary Examiner* — Robert Jones, Jr.
(74) *Attorney, Agent, or Firm* — Roberts Mlotkowski Safran & Cole P.C.

(57) ABSTRACT

Provided is a method and an apparatus for producing a polyvinyl alcohol that can reduce energy consumption without deterioration in quality of the product polyvinyl alcohol. First, one or more vinyl esters are polymerized or a vinyl ester and other copolymerizable monomers are copolymerized to give a polyvinyl ester. Then, a raw saponification solution containing the polyvinyl ester and an organic solvent is fed through a channel 1 and a saponification catalyst-containing solution is introduced into the center of the channel. They are then mixed with static mixers 2 and the mixture 4 is subjected to saponification reaction, as it is placed on a belt 3.

6 Claims, 4 Drawing Sheets

(a)

(b)

PRODUCTION METHOD AND PRODUCTION DEVICE FOR POLYVINYL ALCOHOL RESINS

TECHNICAL FIELD

The present invention relates to a method and an apparatus for producing a polyvinyl alcohol resin. More specifically, it relates to a technology concerning the saponification step carried out in production of a polyvinyl alcohol resin.

BACKGROUND ART

Polyvinyl alcohol (PVA), a water-soluble synthetic resin, has been used mainly as a raw material for synthetic fibers. Recently, it is used in various fields, for example for production of film materials, emulsifying dispersants, adhesives and binder resins, because of its favorable properties. The PVA resins are generally produced by polymerization of a vinyl ester and saponification of the resulting polyvinyl ester in an organic solvent in the presence of a catalyst.

For saponification of the polyvinyl ester then, for example, a belt reactor equipped with an in-line mixer is used. FIG. 4 is a view illustrating a conventional saponification method using a belt reactor. As shown in FIG. 4, when PVA is produced by saponification of polyvinyl acetate in methanol solvent in the presence of an alkali catalyst in a conventional belt reactor, a methanol solution of polyvinyl acetate and an alkaline solution are first placed in a mixing container 101 and agitated for example in a rotor mixer (mixer) 102 for a particular time. The mixture 104 is then placed on a belt 103, where the saponification reaction is allowed to proceed under a particular temperature condition.

Also proposed conventionally were methods wherein a liquid (slurry) for saponification reaction containing a polyvinyl ester and an organic solvent and a saponification catalyst are mixed in a kneader and the saponification reaction is then allowed to proceed in a tower-type saponification reactor (see Patent Documents 1 and 2). Also proposed are a method of mixing a polyvinyl ester solution and a saponification catalyst in an in-line mixer and saponifying the polyvinyl ester in a reactor equipped with a planetary stirrer (see Patent Document 3) and an apparatus having a static mixer in a rector for saponification (see Patent Document 4).

CITATION LIST

Patent Documents

[Patent Document 1] Japanese Unexamined Patent Application Publication No. 2000-355611
[Patent Document 2] Japanese Unexamined Patent Application Publication No. 2001-55414
[Patent Document 3] Japanese Translation of PCT No. 2008-510880
[Patent Document 4] International Patent Application Publication

SUMMARY OF INVENTION

Technical Problem

However, conventional saponification methods described above have the following disadvantages. Namely, they have a disadvantage that methods using a mixer demanding high power, such as rotor mixer, kneader or planetary stirrer, are higher in energy consumption. Alternatively when a static mixer is used as the mixer, as in the apparatus described in Patent Document 4, it is possible to reduce energy consumption, but not possible to mix the raw materials uniformly only by installing a static mixer in the reactor. Yet alternatively, the technology described in Patent Document 4 has a disadvantage that it demands a pressure-resistant apparatus because a supercritical or high-temperature high-pressure fluid is used.

Accordingly, a main object of the present invention is to provide a method and an apparatus for production of polyvinyl alcohol that can reduce energy consumption without deterioration in quality.

Solution to Problem

The method of producing a polyvinyl alcohol resin according to the present invention includes an introducing step of introducing a saponification catalyst to the center of a channel for flow of a raw saponification solution containing a polyvinyl ester and an organic solvent and a mixing step of mixing the raw saponification solution and the introduced saponification catalyst by static mixer.

Because the raw materials are mixed by the static mixer in the present invention, no energy is needed for the mixing. In addition, the mixing by the static mixer does not generate heat, thus preventing progress of the saponification reaction during mixing. Therefore, the polyvinyl alcohol resin produced has more stabilized quality. Further because the saponification catalyst is introduced to the center of the channel for flow of the raw saponification solution, the mixing efficiency is higher and the raw saponification solution and the catalyst can be mixed in a shorter period of time.

In this production method, the mixture obtained from the mixing step can be subjected to saponification reaction, as it is placed on a belt.

The concentration of polyvinyl ester in the raw saponification solution may be adjusted to 20 to 60 mass % and the viscosity thereof to 0.01 to 30 Pa·s before introduction of the saponification catalyst into the raw saponification solution to a catalyst concentration of 0.2 to 10 mass % in the raw saponification solution.

The apparatus for producing a polyvinyl alcohol resin according to the present invention includes a catalyst-introducing mechanism for introducing a saponification catalyst to the center of a channel for flow of the raw saponification solution containing a polyvinyl ester and an organic solvent and one or more static mixers installed downstream of the catalyst-introducing mechanism for mixing the raw saponification solution with the introduced saponification catalyst.

Because static mixers are used as the mixers in the present invention, there is no need for the power for operation of the mixers. Additionally, the static mixers do not generate mixing heat, thus preventing progress of the saponification reaction during mixing and stabilizing the quality of the product. Further because the catalyst is introduced into the center of the channel by the catalyst-introducing mechanism, the mixture can be mixed favorably in a short period of time.

The apparatus may contain static mixers having a pressure drop per element of less than 0.05 MPa.

In addition, the apparatus may have a unidirectionally moving belt and, in such a case, the saponification reaction may be allowed to proceed, as the mixture discharged from the static mixer is placed thereon.

Further, the catalyst-introducing mechanism may have an introducing pipe for flow of the catalyst-containing solution which is formed, as it crosses the center of the channel and extends through the channel in the direction perpendicular to the flow direction, and an introduction port having an opening facing the static mixer which is formed at the position of the introducing pipe equivalent to the center of the channel.

Advantageous Effect of Invention

The present invention, wherein a saponification catalyst is introduced into the center of a channel for flow of a raw saponification solution containing a polyvinyl ester and an organic solvent and the mixture is mixed by a static mixer, can reduce energy consumption without deterioration in quality of the polyvinyl alcohol resin produced.

DESCRIPTION OF EMBODIMENTS

Hereinafter, favorable embodiments of the present invention will be described in detail with reference to attached drawings. It should be understood that the present invention is not restricted by the embodiments described below. In the method of producing a polyvinyl alcohol (PVA) resin according to an embodiment of the present invention, a PVA resin is produced in a polymerization step and a saponification step shown below.

[Polymerization Step]

In the method of producing a polyvinyl alcohol resin in the present embodiment, a polyvinyl ester is prepared by polymerization of one or more vinyl esters or by copolymerization of a vinyl ester with other monomers copolymerizable therewith. The vinyl esters for use include, for example, vinyl formate, vinyl acetate, vinyl propionate, vinyl valerate, vinyl caproate, vinyl laurate, vinyl stearate, vinyl benzoate, vinyl pivalate and vinyl versatate, but vinyl acetate is preferable from the viewpoint of polymerization stability.

Other monomers copolymerizable with these vinyl esters include, but are not particularly limited to, for example, α-olefins such as ethylene and propylene; alkyl (meth)acrylate esters such as methyl (meth)acrylate, ethyl (meth)acrylate, butyl (meth)acrylate and 2-ethylhexyl (meth)acrylate; unsaturated amides such as (meth)acrylamide and N-methylol acrylamide; unsaturated acids such as (meth)acrylic acid, crotonic acid, maleic acid, itaconic acid and fumaric acid; unsaturated acid alkyl (such as methyl, ethyl and propyl) esters; unsaturated acid anhydrides such as maleic anhydride; unsaturated acid salts (such as sodium salts, potassium salts, ammonium salts, etc.); glycidyl group-containing monomers such as allyl glycidylether and glycidyl (meth)acrylate; sulfonic acid group-containing monomer such as 2-acrylamido-2-methylpropanesulfonic acid and the salts thereof; phosphate group-containing monomers such as acid phosphoxyethyl methacrylate and acid phosphoxypropyl methacrylate; alkyl vinylethers and the like.

[Saponification Step]

The polyvinyl ester obtained in the polymerization step described above is then saponified in an organic solvent in the presence of a catalyst. Alcohols such as methanol, ethanol, propanol, ethylene glycol, propylene glycol, glycerol and diethylene glycol can be used as the organic solvents for use, but methanol is particularly preferable.

Examples of the saponification catalysts include alkali catalysts such as sodium hydroxide, potassium hydroxide, sodium alcoholate and sodium carbonate and acid catalysts such as sulfuric acid, phosphoric acid and hydrochloric acid. Among the saponification catalysts above, use of an alkali catalyst is preferable and use of sodium hydroxide is more preferable. It is thus possible to raise saponification rate and improve productivity.

Figure 1:
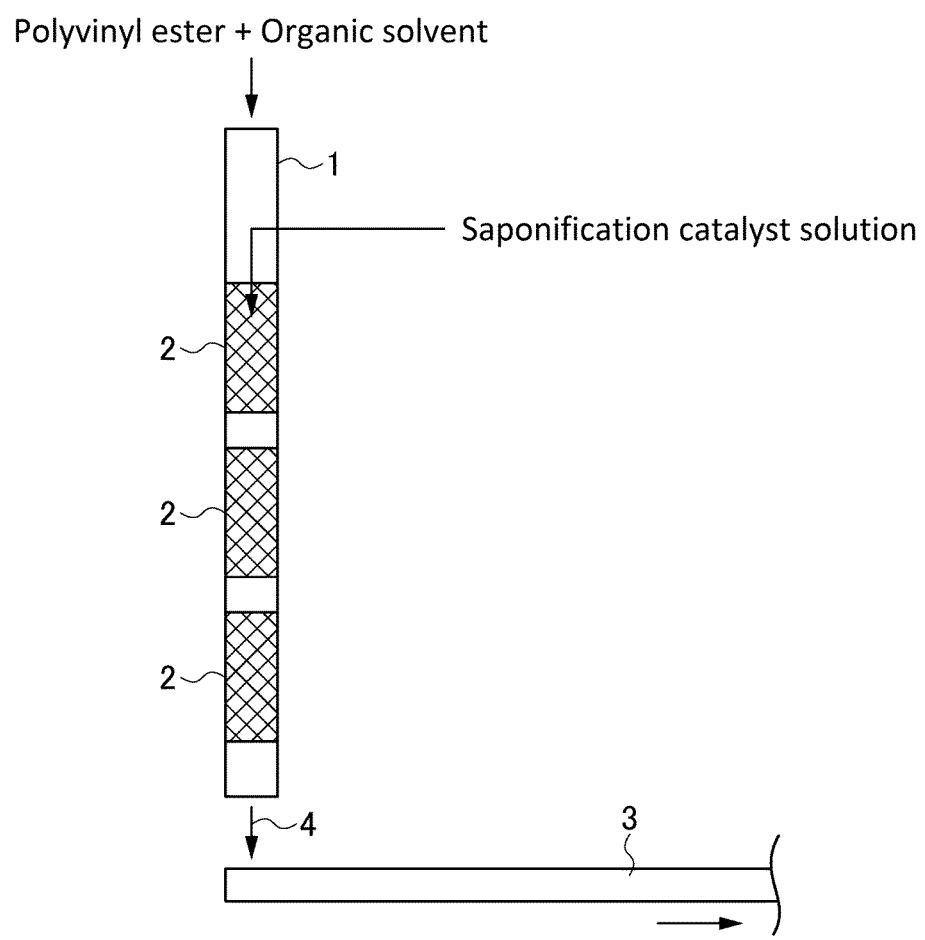
FIG. 1 is a schematic view illustrating the configuration of a saponification apparatus used in a method of producing a polyvinyl alcohol resin according to an embodiment of the present invention.
Figure 2:
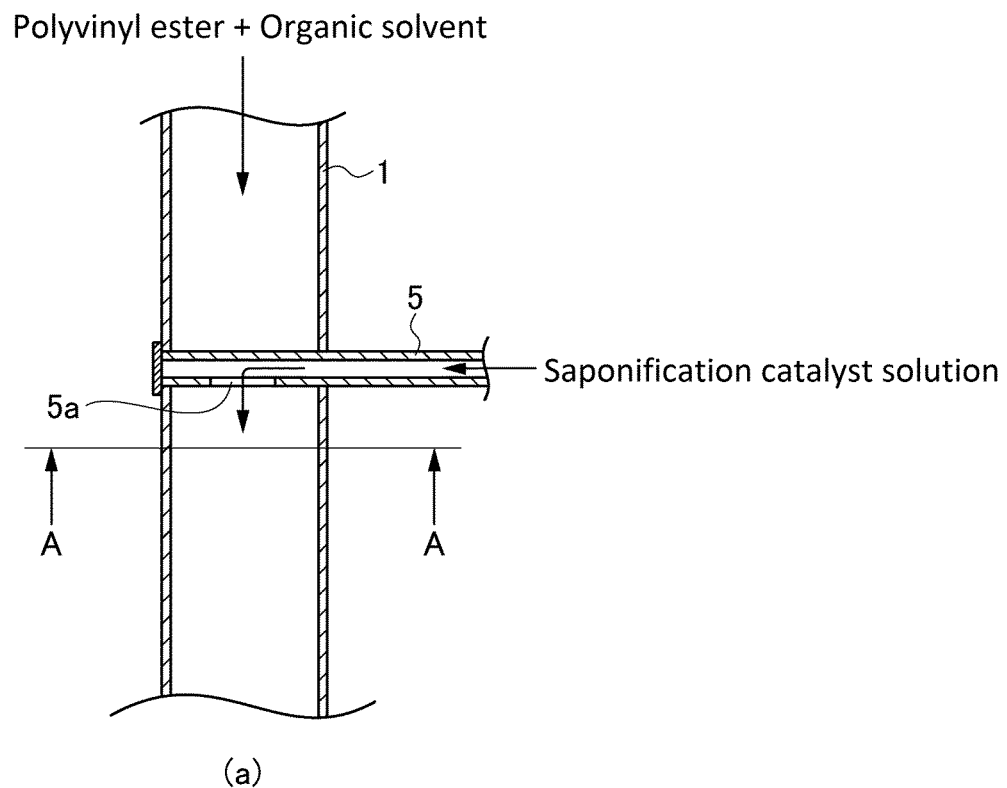
FIG. 2(a) is a sectional view illustrating a configuration example of a catalyst-introducing mechanism in the saponification apparatus shown in FIG. 1
FIG. 2(b) is a cross-sectional view taken along the line A-A in FIG. 2(a).
Figure 2:
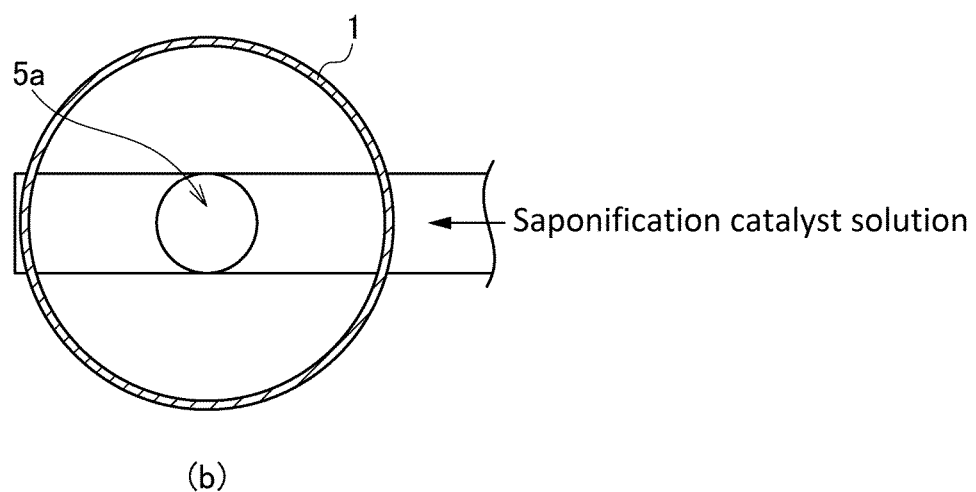

FIG. 1 is a schematic view illustrating the configuration of a saponification apparatus used in a method of producing a PVA resin in the present embodiment. FIG. 2(a) is a sectional view illustrating a configuration example of catalyst-introducing mechanism therein and FIG. 2(b) is a cross-sectional view taken along the line A-A shown in FIG. 2(a). In the method of producing a PVA resin according to the present embodiment, for example as shown in FIGS. 1 and 2, a raw saponification solution containing a polyvinyl ester, which was obtained in the polymerization step, and an organic solvent is fed into a channel 1 and a saponification catalyst-containing solution is introduced to the center of the stream. They are then mixed by a static mixer 2 and the resulting mixture 4 is subjected to saponification reaction, as it is placed, for example, on a belt 3.

The viscosity of the raw saponification solution then is preferably 0.01 to 30 Pa·s. It is because the amount of the solvent used increases, thus leading to increase of the production cost, when the viscosity of the raw saponification solution is less than 0.01 Pa·s and it becomes difficult to feed the raw saponification solution when the viscosity thereof is more than 30 Pa·s.

The concentration of the polyvinyl ester in the raw saponification solution is preferably 20 to 60 mass %. Although a polyvinyl ester concentration of less than 20 mass % makes the reaction proceed easily, because of the decrease in solution viscosity, it also demands use of a greater amount of the solvent, leading to increase in the production cost of the PVA resin. Alternatively, a polyvinyl ester concentration of more than 60 mass % may make it difficult to feed the solution because of high viscosity.

Alternatively, the concentration of the saponification catalyst in the saponification catalyst solution is preferably 0.2 to 10 mass %. It is because the reaction rate may decline when the saponification catalyst concentration is less than 0.2 mass % and neutralization reaction after the reaction may generate a great amount of salts, demanding a great amount of washing liquid in a washing step, when the saponification catalyst concentration is more than 10 mass %.

As for the method of introducing the saponification catalyst solution into the center of the channel 1, for example, as shown in FIG. 2, a saponification catalyst-introducing pipe 5 having an introduction port 5a is made to extend through the channel 1 in the direction perpendicular to a flow direction with the introduction port 5a facing downstream in the flow direction in the center of the channel 2. The saponification catalyst-introducing pipe 5 is made to extend through the channel in order to reduce as much as possible fluctuation in flow rate at various points in the cross section perpendicular to the flow direction of the channel 1 and generation of turbulence of the stream of the raw saponification solution.

The saponification catalyst solution is introduced into the center of the channel 1 for the purpose of improving the mixing efficiency. If the saponification catalyst solution is introduced to a point separated from the center of the channel 1, fluctuation in concentration occurs at various points in the cross section perpendicular to the flow direction. The size of the introduction port 5a is not particularly limited, but desirably ¹/₂₀ to ½ of the diameter of the channel 1. It is possible, by the catalyst-introducing mechanism installed in such a configuration, to reduce turbulence of the stream of the raw saponification solution and to mix the raw materials efficiently.

The method of introducing the saponification catalyst solution is not limited to that shown in FIG. 2 and can be selected properly for example in accordance with the desired system configuration. For example, the saponification catalyst-introducing pipe 5 may be a cantilevered L-shaped pipe, or the saponification catalyst-introducing pipe 5 may be a cross-shaped pipe having an introduction port 5a at the center.

Alternatively, the kind and the number of the static mixers 2 are not particularly limited and can be selected properly in accordance with various conditions such as flow quantity, flow rate and concentration. Use of a static mixer 2 showing a pressure drop per element of less than 0.05 MPa is preferable. It is thus possible to install multiple elements (static mixers) without need for expensive high-allowable pressure pumps and to obtain a favorable mixing state (CoV: 0.01 or less) at an energy less than that before by using existing facilities.

The pressure drop per element by the static mixer 2 is more preferably less than 0.03 MPa. It is thus possible to increase the number of the static mixers 2 used and to raise the mixing efficiency. If the number of the static mixers 2 (elements) used is increased, although the mixing efficiency increases, the pressure drop also increases. Thus, the diameter thereof is preferably selected properly in accordance with the allowable pressures of the raw material-feeding pump and the supply pipe.

In the saponification apparatus used in the method of producing a PVA resin according to the present embodiment, multiple types of static mixers showing different pressure drops may be used in combination. Shear rate and pressure drop are in the relationship of tradeoff and, for example, it is needed to reduce the diameter of the static mixer to obtain higher shear rate, but smaller diameter also leads to increase in pressure drop. Even in such a case, it is possible to suppress increase in pressure drop and yet raise shear rate, by using multiple types of static mixers showing different pressure drops and controlling the installation ratio thereof so as to make the pressures applied to respective pumps lower than their allowable pressures.

The mixture 4 obtained after mixing by the static mixer 2 is left for saponification reaction under a particular temperature condition for a particular time. For example in the case of the belt reactor shown in FIG. 1, the mixture is left under a temperature condition of 20 to 50° C., as the belt 3 is driven. The retention time then can be determined in accordance with the desired saponification degree and is, for example, about 30 minutes if an average saponification degree of about 90 mole % is desired. The present invention is not limited to use of a belt reactor and, for example, a kneader- or tower-type reactor can also be used instead of the belt reactor.

In the saponification step, part or all of the vinyl ester groups in the polyvinyl ester are saponificated to vinyl alcohol groups. The saponification degree of the PVA resin obtained in the saponification step described above is not particularly limited and may be determined arbitrarily, for example, according to its application.

Also in the method of producing a PVA resin according to the present embodiment, a washing step for removal of impurities such as sodium acetate and a drying step may be carried out, as needed, after the polymerization and saponification steps above.

As described above in detail, in the method of producing a polyvinyl alcohol resin according to the present embodiment, there is no need for the power for mixing, because the raw saponification solution and the saponification catalyst solution are mixed by a static mixer. It is thus possible to reduce the energy consumption considerably in the saponification step. In addition, because the static mixer does not generate mixing heat, no saponification reaction proceeds during mixing. Accordingly, it is possible to stabilize the quality of the PVA resin produced.

Further in the method of producing a PVA resin according to the present embodiment, because a saponification catalyst-containing solution is introduced to the center of the channel for flow of the raw saponification solution containing a polyvinyl ester and an organic solvent, it is possible to obtain favorable mixing state in a short period of time even when a static mixer is used. Consequently, it is possible to reduce the energy needed for production without deterioration in quality of the PVA resin produced.

Examples

Figure 4:
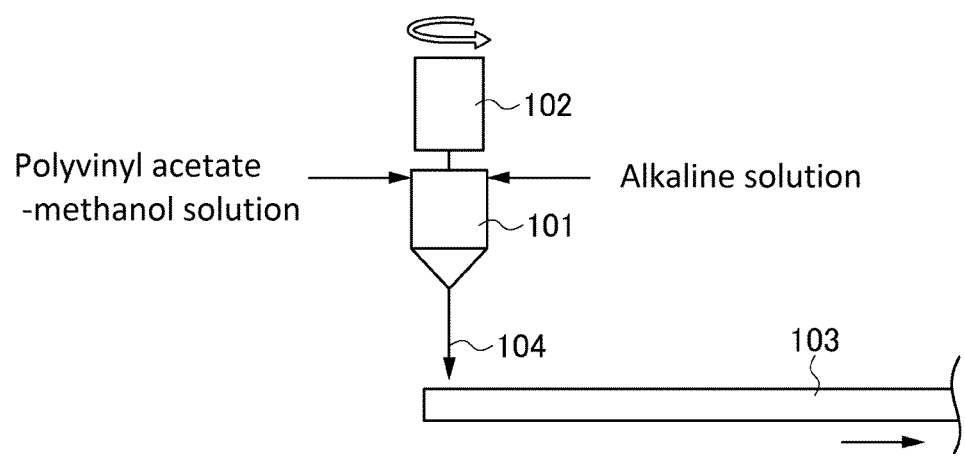
FIG. 4 is a view illustrating a conventional saponification method using a belt reactor.

Hereinafter, the advantageous effects of the present invention will be described specifically with reference to Examples and Comparative Examples of the present invention. In each of the Examples, a polyvinyl acetate obtained in a polymerization step is saponified in a belt reactor equipped with the static mixer 2 shown in FIG. 1 (Examples) or in a belt reactor equipped with the rotor mixer 102 shown in FIG. 4 (Comparative Example), to give a polyvinyl alcohol (PVA) resin.

Specifically, in Examples 1 to 5, a raw saponification solution, i.e., polyvinyl acetate-methanol solution (concentration: 37.5 mass %) and a saponification catalyst solution, i.e., sodium hydroxide-methanol solution (concentration: 3 mass %) were mixed under the condition shown in the following Table 1, by using two kinds of static mixer A (high pressure drop) and B (low pressure drop) different in pressure drop per element. On the other hand, in Comparative Example 1, a polyvinyl acetate-methanol solution (concentration: 37.5 mass %) and a sodium hydroxide-methanol solution (concentration: 1.5 mass %) were mixed under the condition shown in the following Table 1 at a rotational frequency of 650 rpm by using a rotor mixer consisting of a casing and a pin, which is used as the rotor.

TABLE 1

| | Comparative Example 1 | Example 1 | Example 2 | Example 3 | Example 4 | Example 5 |
|---|---|---|---|---|---|---|
| Kind of mixer | Rotor mixer | Static mixer A | Static mixer B | Static mixer A | Static mixer A | Static mixer A |

TABLE 1-continued

| | | Comparative Example 1 | Example 1 | Example 2 | Example 3 | Example 4 | Example 5 |
|---|---|---|---|---|---|---|---|
| Number of elements (units) | | — | 16 | 20 | 20 | 15 | 10 |
| Feed rate (liter/hour) | Raw saponification solution | 5106 | 5106 | 7323 | 7323 | 7323 | 7323 |
| | Saponification catalyst solution | 606 | 606 | 844 | 844 | 844 | 844 |
| Shear rate (1/s) | | — | 350 | 400 | 500 | 500 | 500 |
| Temperature of raw saponification solution at inlet port (° C.) | | 35 | 38 | 42 | 42 | 42 | 42 |
| Mixing heat ΔT (° C.) | | 4 | 0 | 0 | 0 | 0 | 0 |
| Viscosity (Pa·s) | Before mixing | 5.4 | 5.4 | 5.3 | 5.1 | 5.1 | 5.1 |
| | After mixing | 3.3 | 3.3 | 3.2 | 3.1 | 3.1 | 3.1 |
| Motor power (kW) | | 33 | — | — | — | — | — |
| CoV | | — | 0.0075 | 0.0012 | 0.0012 | 0.012 | 0.12 |
| Pressure drop (MPa) | | 0.51 | 0.63 | 0.52 | 0.94 | 0.73 | 0.52 |
| Residence time (sec) | | 6.9 | 2.1 | 1.7 | 1.8 | 1.4 | 0.9 |

The viscosity shown in Table 1 was determined by using a CVO rheometer under the condition of: mode: viscometry-mode multi-shear rate measurement, temperature: 40° C., concentration: 37.5 mass %, cone: CP4°/40 mm, shear rate: 1 to 1000 s$^{-1}$, Delay: 5 to 15 seconds and integration: 10 seconds. The motor power is a value calculated, as the motor efficiency is estimated as 0.6. In addition, the CoV (Coefficient of Variation) is the deviation constant ($\sigma/X$) at the mixer outlet.

The mixture prepared by the method under the condition described above was then placed on a belt 3 or 103 and left at a temperature condition of 40° C. for 30 minutes for progress of saponification reaction. The mixture was then filtered and dried, to give each of the PVA resins of Examples 1 to 5 and Comparative Example 1.

The saponification degree distribution of the PVA resins of Example 1 and Comparative Example 1 was determined by infrared spectroscopy (IR). Specifically, IR absorption by each of 50 arbitrarily chosen PVA particles was determined by using an FT-IR8400 apparatus manufactured by Shimadzu Corporation equipped with a single-reflection total reflection analyzer (ZnSe prism) and the saponification degree of each particle was calculated according to the formula shown by the following mathematical expression 1: $D_{1730}$ in the following expression 1 is the absorbance at a wave number of 1730 cm$^{-1}$ and $D_{844}$ at a wave number of 844 cm$^{-1}$.

$$\text{Saponification degree (mol \%)} = \frac{D_{1730}}{D_{844}} \times 3.593 \quad \text{[Formula 1]}$$

Figure 3:
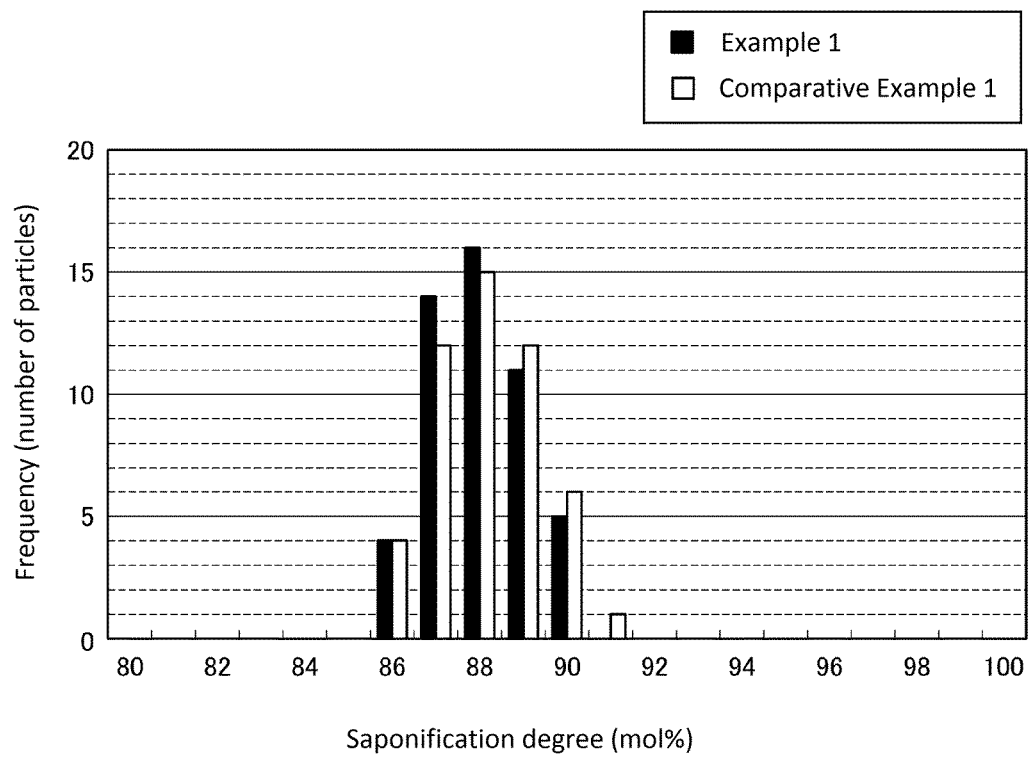
FIG. 3 is a histogram showing distribution of the saponification degrees of the PVA resins in Example 1 and Comparative Example 1, the saponification degrees being plotted on the abscissa and the frequency on the ordinate.

FIG. 3 is a histogram showing distribution of the saponification degrees of the PVA resins in Example 1 and Comparative Example 1, wherein the saponification degrees are plotted on the abscissa and the frequency on the ordinate. As shown in FIG. 3, even when a static mixer is used for mixing, a PVA resin having a saponification degree distribution equivalent to that when a rotor mixer is used was obtained.

If a rotor mixer is assumed to operate for 8000 hours a year, because the motor power is 33 kW, as shown in Table 1, the annual power consumption is about 260 MWH. In contrast when the mixer is replaced with static mixers, all of the power consumption can be eliminated. In addition as shown in Table 1, a mixing heat of 4° C. was generated in the case of mixing with a rotor mixer, but the mixing heat was not generated when the mixing is carried out with static mixers.

The results above show that it is possible to produce a PVA resin at a quality no lower than that of conventional products with an energy consumption smaller than that before, by using static mixers as the mixer and introducing a saponification catalyst solution into the center of the channel for flow of a raw saponification solution.

REFERENCE SIGNS LIST

1: Channel
2: Static mixer
3, 103: Belt
4, 104: Mixture
5: Saponification catalyst-introducing pipe
5a: Introduction port
101: Mixing container
102: Rotor mixer

The invention claimed is:

1. A method of producing a polyvinyl alcohol resin, comprising:
    an introducing step of introducing a saponification catalyst to an introduction port, of which the size is 1/20 to 1/2 of the diameter of a channel, formed at the center of the channel for flow from top to bottom of a raw saponification solution containing a polyvinyl ester and an organic solvent; and
    a mixing step of mixing the raw saponification solution and the introduced saponification catalyst by static mixer,
    wherein the concentration of the polyvinyl ester in the raw saponification solution is 20 to 60 mass %, the viscosity is 0.01 to 30 Pa·s, and the saponification catalyst is introduced into the raw saponification solution to a catalyst concentration of 0.2 to 10 mass %.

2. The method of producing a polyvinyl alcohol resin according to claim 1, wherein the mixture obtained in the mixing step is subjected to saponification reaction, as it is placed on a belt.

3. An apparatus for producing a polyvinyl alcohol resin, comprising:
    a catalyst-introducing mechanism for introducing a saponification catalyst to an introduction port, of which the size is 1/20 to 1/2 of the diameter of a channel, formed at the center of the channel for flow from top to bottom of a raw saponification solution containing a polyvinyl ester and an organic solvent; and one or more static mixers installed downstream of the catalyst-introducing mechanism for mixing the raw saponification solution with the introduced saponification catalyst.

4. The apparatus for producing a polyvinyl alcohol resin according to claim 3, wherein the static mixer shows a pressure drop per element of less than 0.05 MPa.

5. The apparatus for producing a polyvinyl alcohol resin according to claim 3, further comprising a belt movable unidirectionally, wherein the mixture discharged from the static mixer is subjected to saponification reaction, as it is placed on the belt.

6. The apparatus for producing a polyvinyl alcohol resin according to claim 3, wherein the catalyst-introducing mechanism has an introducing pipe for flow of the catalyst-containing solution which is formed, as it crosses the center of the channel and extends through the channel in the direction perpendicular to the flow direction, and an introduction port having an opening facing the static mixer which is formed at the position of the introducing pipe equivalent to the center of the channel.

* * * * *